United States Patent [19]

Göhrlich et al.

[11] Patent Number: 5,039,117
[45] Date of Patent: Aug. 13, 1991

[54] CYLINDER HEAD GASKET

[75] Inventors: Bruno Göhrlich, Weissehorn; Kurt Höhe, Langenau, both of Fed. Rep. of Germany

[73] Assignee: Reinz-Dichtungs-GmbH, Neu-Ulm, Fed. Rep. of Germany

[21] Appl. No.: 390,544

[22] Filed: Aug. 8, 1989

[30] Foreign Application Priority Data

Aug. 11, 1988 [DE] Fed. Rep. of Germany ....... 3827324

[51] Int. Cl.$^5$ .............................................. F16J 15/12
[52] U.S. Cl. ................................. 277/235 B; 277/181; 277/189
[58] Field of Search ............... 277/235 B, 234, 235 R, 277/181, 189

[56] References Cited

U.S. PATENT DOCUMENTS 3,108,818 10/1963 Furstenburg ........................ 277/189
3,565,449 2/1971 Ascencio et al. ............... 277/235 B
4,272,085 6/1981 Fujikawa et al. ............... 277/235 B

FOREIGN PATENT DOCUMENTS 1576720 6/1970 Fed. Rep. of Germany ... 277/235 B
0050257 3/1985 Japan ............................... 277/235 B
2092244 8/1982 United Kingdom ............ 277/235 B Primary Examiner—William A. Cuchlinski, Jr.
Assistant Examiner—Daniel G. DePumpo
Attorney, Agent, or Firm—Fleit, Jacobson, Cohn, Price, Holman & Stern

[57] ABSTRACT

This invention relates to a flat gasket, and particularly a cylinder head gasket for internal combustion engines. In order to obtain a less expensive arrangement of the metallic seal and the soft material gasket ring, a direct procedure is adopted to provide a positive connection using metallic sealing projections provided on the seal.

7 Claims, 1 Drawing Sheet

CYLINDER HEAD GASKET

BACKGROUND OF THE INVENTION

This invention relates to a cylinder head gasket with a gasket ring made from a soft material and having at least one sealing passage, which is bounded in roughly aligned manner by a metallic sealing element having the axial thickness of the soft material. On the outer circumference of the sealing element, several roughly radially projecting projections are positionally fixed in the soft material.

Such a cylinder head gasket is known from U.S. Pat. No. 3,565,449. The metallic sealing element disclosed by this patent comprises an annular element with a circular, solid profile, which is held by a U-shaped, profiled sheet metal ring. On the outer circumference of the sheet metal ring are provided radially outwardly projecting projections, which fix the sealing element in position on the soft material. However, a multipart sealing element of this type is technically complicated and therefore expensive to manufacture. If different metals are used for the annular sealing element and the surrounding U-shaped sheet metal ring, there can also be increased corrosion at the contact points. Particularly in connection with high quality requirements for cylinder head gaskets used in internal combustion engines, it is difficult to initially check the quality of the gasket components and then subsequently the gasket as a fitted member.

Obviously, on reducing the number of components, there is a reduction in the assembly expenditure with respect to the cylinder gasket head manufacture. In an assembly including a known cylinder head gasket with a U-shaped sheet metal ring, tolerance problems can also occur with respect to the material thickness of the complete flat gasket, particularly in the vicinity of the projections.

SUMMARY OF THE INVENTION

Considering the aforementioned prior art and the indicated disadvantages, the object of the present invention is to be able to manufacture a cylinder head gasket of the aforementioned type with a minimum number of components and relatively low production expenditure, even when close tolerances are required.

This object is achieved by constructing the sealing element as a solid, one-piece ring providing projections having a smaller material thickness than that of the ring.

A fundamental feature is that the outer circumference of the metallic sealing element is provided with several projections or tongues, which are used for fixing the sealing element to the soft material gasket ring. Appropriately, the projections have a smaller material thickness, so that the metallic sealing element is adequately positionally fixed in the gasket ring by pressing it on or in the gasket ring to provide a positive connection. The material reduction of the projection also has the advantages that no excessively great pressing is required and there is a substantially aligned principal plane on both sides of the flat gasket.

The cylinder head gasket can also be used for other functions in other constructions as a high temperature-resistant and thermally stable flat gasket.

The soft material can be a relatively resilient sealing material, such as metal-lined asbestos, or a comparable material, such as an asbestos-rubber composite material.

Advantageously, projections are provided in one piece on the outer circumference of the metallic sealing element, which normally has a ring structure. Such a metallic sealing element, having one-piece projections, requires only the following manufacturing steps. The metallic seal is punched out, together with the symmetrically or partly asymmetrically arranged projections. The material thickness of the projections is reduced, by cold impact extrusion, to approximately a half or a third the material thickness of the metallic seal. Sheet metal material which is displaced by the cold impact extrusion is punched off. For the positional fixing of the projections and the metallic seal, there is a substantially positive connection of the main surface facing the cylinder head to the other main surface resting on the engine frame. The projections are bent up to correspond to the openings through which the projections are offset or guided in an S-shaped manner.

It has proved particularly advantageous, from a manufacturing standpoint, that to provide a reliable association of the surfaces, to form at least one of the four projections, which would otherwise be provided symmetrically on the outer circumference of the metal seal, asymmetrically. This ensures that there is no laterally transposed insertion of the sealing element in the sealing passage of the gasket ring. This is particularly important in connection with profiled sealing regions of the metal seal and the pressing in process of the projections with the gasket ring, in order to achieve positional fixing and substantially aligned main surfaces.

The material reduction of the projections from the substantially aligned principal planes ensures that when the gasket is in use, there are no increased and disturbing non-uniform bracing forces between the cylinder head and the engine frame. With respect to the material thickness, the connection point between the projections and the soft material is made such that no permanent deformations to the components occur.

Another alternative to the one-piece shaping of the tongues on the metallic seal is for the tongues to be welded, particularly laser welded in the desired material thickness. This production process can lead to an overall material saving and would obviate the cold impact extrusion and subsequent punching off processes.

The aforementioned connecting procedure between a metallic seal and the adjacent soft material serves to precisely arrange the sealing element in the soft material. The connection must be protected during transportation and assembly because it must not fail to fulfill the sealing function following the assembly of the engine frame to the cylinder head. An extremely simple, inexpensive and reliably manipulatable flat gasket is provided for this function.

BRIEF DESCRIPTION OF THE DRAWINGS

The invention is described in greater detail hereinafter in connection with a non-limitative embodiment and the attached drawings, wherein.

DETAILED DESCRIPTION OF THE PREFERRED EMBODIMENT

Figure 1:
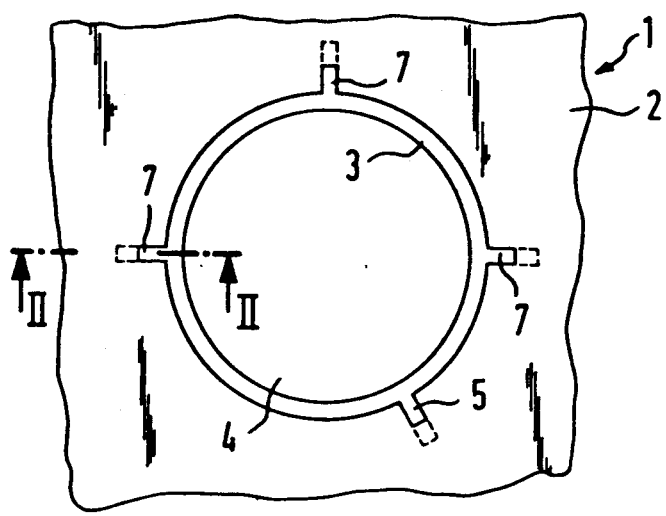
FIG. 1 is a plan view of the cylinder head side of a flat gasket shown in detail formed with an annular, metallic sealing element.

FIG. 1 is a plan view, from the side, of an inventive flat gasket 1 facing the cylinder head. The flat gasket 1 comprises a soft material gasket ring 2, which has a circular sealing passage 4. The passage 4 essentially corresponds to the external diameter of a cylinder liner 13 (of FIG. 2). In its preferred use, as diagrammatically shown, the flat gasket 1 is a cylinder head gasket. A metallic seal 3 is inserted, in an accurate fitting manner, in the circular sealing passage 4.

The metal seal 3 has, on its outer circumference, four sealing projections 5 and 7. Projection 5 is asymmetrical, and, for example, is oriented roughly at an angle of 70° with respect to the next adjacent projection 7. The asymmetrical arrangement of sealing projections 5 and 7 unmistakably defines a precise orientation at which the metal seal 3 is inserted in the sealing passage 4.

Figure 2:
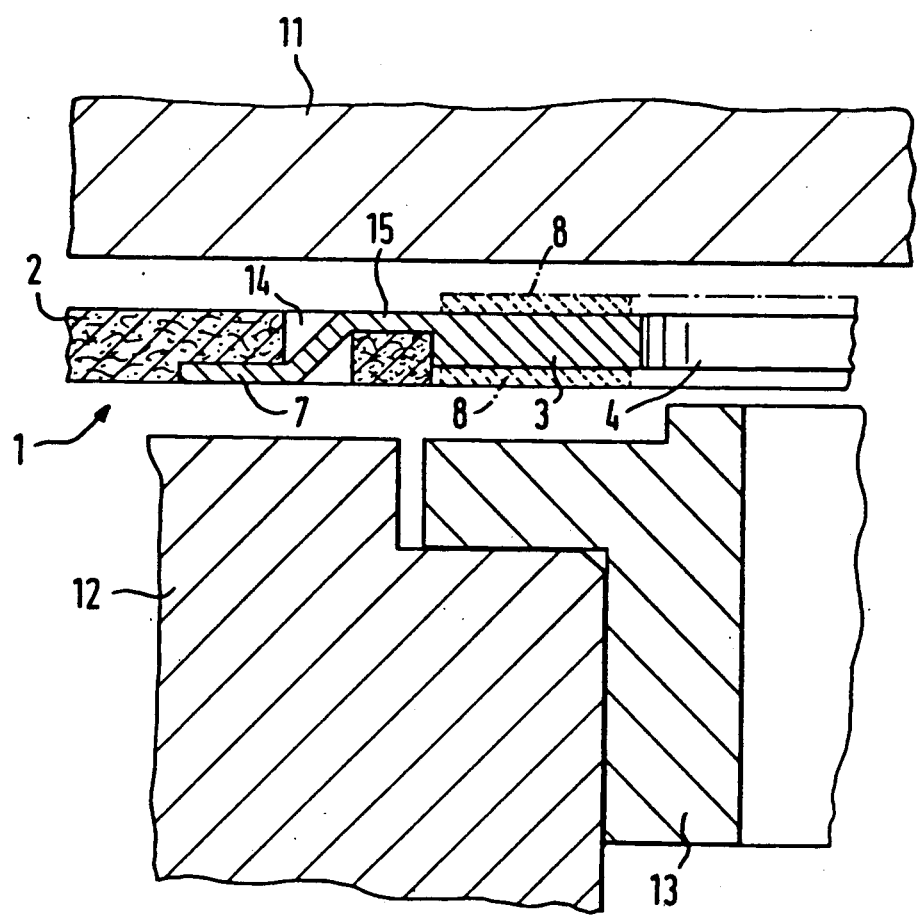
FIG. 2 is a detailed view as seen along line A-B of FIG. 1 in an assembly plane of the engine frame and cylinder head.

Referring to the vertical section along line A-B according to FIG. 2, it is clear that on the cylinder head side of flat gasket 1, the sealing projection 7 passes out, in an aligned manner, from the metal seal 3. Projection 7 has a significantly reduced material thickness of, e.g., one third of that of seal 3.

Metal seal 3 is produced together with its sealing projections 7 in a punching process. The material thickness of sealing projections 7 is normally reduced in a cold impact extrusion process with subsequent punching off to the final size. This is followed by the shaping of the projections 7 in an accurate manner so that the seal 3 forms opening 14 in the inner marginal region of gasket ring 2. Due to this accurate fitting, it is possible to insert the metal seal 3 of FIG. 2 from the cylinder head side into the opening for sealing passage 4. By means of a subsequent pressing in or flat pressing process, there is an offsetting or S-shaped positive connection via opening 14 with the engine frame-side surface of gasket ring 2. Even following the pressing in process, the main surfaces of the gasket ring are aligned with seal 3 and the sealing projections 5 and 7. Thus, on fixing the cylinder head 11 to the engine frame 12, there are no undesirable forces produced as a result of significantly different material thicknesses of the elements forming flat gasket 1.

In FIG. 2, engine frame 12 is shown in detail in the lower part of the figure, and a cylinder liner 13 is shown as having already been inserted therein. The material reduction 15 of sealing projection 7 is located on the cylinder head side and the passing-out end of projection 7 on the engine frame side. A laterally transposed arrangement of this positive connection between the sealing projections 5 and 7 of metal seal 3 and gasket ring 2 is conceivable. Profiled areas 8 are indicated on both sides of the seal 3 and can be elevated and depressed metal areas, which ensure improved sealing.

The gasket ring normally has the same material thickness, because the elasticity of the soft material ensures an adequate material compression for an aligned, positive engagement between the projections 5 and 7 and the gasket ring. However, to bring about a further improvement, there can be slightly reduced material thicknesses in the region of the positive connection of the gasket ring and the sealing projections.

What is claimed is:

1. A cylinder head gasket comprising:
   a gasket ring made from a soft material, which has at least one sealing passage,
   a metallic sealing element bounding said at least one sealing passage in an approximately aligned manner and having an axial thickness substantially the same as an axial thickness of the gasket ring made from soft material, and
   several roughly radially extending metallic projections, positionally fixed in the gasket ring made from soft material, integrally formed with and provided on an outer circumference of said metallic sealing element, the metallic sealing element being constructed as a solid one-piece ring, the metallic projections having a smaller material thickness than the metallic sealing element, opposed main surfaces of the gasket ring and of the metallic sealing element being substantially aligned after the projections have been positionally fixed in said gasket ring made from soft material,
   at least one of said metallic projections being arranged asymmetrically on the outer circumference of the metallic sealing element with respect to adjacent projections, each of said metallic projections including a first radially inner portion having one outer surface aligned, on a cylinder head side of said cylinder head gasket, with one of said opposed main surfaces of the gasket ring and of the metallic sealing element, a second, radially intermediate portion extending through an opening in an inner marginal region of said gasket ring, and a third, radially outer portion positionally fixed in the gasket ring and including another outer surface, opposite to said one outer surface in an axial direction, aligned, on an engine frame side of said cylinder head gasket, with the other of said opposed main surfaces of the gasket ring and of the metallic sealing element, said second, radially intermediate portion being offset relative to said first and third portions.

2. A cylinder head gasket according to claim 1, wherein the projections are pressed into the soft material.

3. A cylinder head gasket according to claim 1, wherein the projections are positively connected to the soft material.

4. A cylinder head gasket according to claim 1, wherein main surfaces of the soft material and the sealing element are substantially aligned after the projections have been positionally fixed in said soft material.

5. A cylinder head gasket according to claim 1, wherein the projections are formed by punching on the sealing element.

6. A cylinder head gasket according to claim 1, wherein each of the metallic projections undergoes a material thickness reduction on said engine frame side of said cylinder head gasket.

7. A cylinder head gasket according to claim 6, wherein the thickness of the projections is reduced by means of cold impact extrusion.

* * * * *